United States Patent
Trahmer et al.

(10) Patent No.: US 9,884,686 B2
(45) Date of Patent: Feb. 6, 2018

(54) AIRCRAFT INCLUDING AN ENGINE ATTACHMENT WITH A CONTROL SURFACE

(71) Applicants: Airbus Operations GmbH, Hamburg (DE); AIRBUS OPERATIONS S.A.S., Toulouse (FR); Oliver Gicquel

(72) Inventors: Bernd Trahmer, Hamburg (DE); Mickael Lallemand, Toulouse (FR); Damien Prat, Colomiers (FR)

(73) Assignees: Airbus Operations GmbH, Hamburg (DE); Airbus Operations (S.A.S.), Toulouse (FR)

(*) Notice: Subject to any disclaimer, the term of this patent is extended or adjusted under 35 U.S.C. 154(b) by 47 days.

(21) Appl. No.: 14/882,946

(22) Filed: Oct. 14, 2015

(65) Prior Publication Data
US 2016/0144966 A1 May 26, 2016

(30) Foreign Application Priority Data
Oct. 14, 2014 (EP) .................................... 14188900

(51) Int. Cl.
*B64C 1/00* (2006.01)
*B64D 27/10* (2006.01)
(Continued)

(52) U.S. Cl.
CPC ............... *B64D 27/10* (2013.01); *B64C 9/00* (2013.01); *B64C 9/16* (2013.01); *B64D 27/14* (2013.01); *Y02T 50/44* (2013.01)

(58) Field of Classification Search
CPC ........ B64D 27/10; B64D 27/14; B64D 27/26; B64C 9/00; B64C 9/16; B64C 9/02; B64C 3/50
See application file for complete search history.

(56) References Cited

U.S. PATENT DOCUMENTS 5,779,191 A * 7/1998 Brislawn .................. B64C 5/02
   244/194
6,607,161 B1 8/2003 Krysinski et al.
(Continued)

FOREIGN PATENT DOCUMENTS

| GB | 1112924 | 5/1968 |
| GB | 2445555 | 7/2008 |
| WO | 98/21092 | 5/1998 |

OTHER PUBLICATIONS

Douglas, "Airplane Characterstics for Airport Planning",1948.*
European Search Report cited in EP 14 18 8900, completed Mar. 24, 2015, six pages.

*Primary Examiner* — Assres H Woldemaryam
(74) *Attorney, Agent, or Firm* — Nixon & Vanderhye P.C.

(57) ABSTRACT

An aircraft including a fuselage extending along a longitudinal axis and having a rear end pointing reward of the aircraft, a main gear connected to the fuselage in a main gear position with respect to the longitudinal axis, and an engine for propelling the aircraft provided outside of the fuselage and attached to the fuselage via an attachment device between the main gear position and the rear end, wherein the engine generates a repulsive air stream streaming in the reverse direction. A surface element is moveably connected to the attachment device. The surface element moves between a neutral position at which it does not deflect the repulsive air stream, and a deflected position at which it deflects the repulsive air stream to assist aircraft rotation during take-off.

23 Claims, 4 Drawing Sheets (51) Int. Cl.
 *B64C 9/00* (2006.01)
 *B64D 27/14* (2006.01)
 *B64C 9/16* (2006.01)

(56) References Cited

U.S. PATENT DOCUMENTS

2008/0245925 A1* 10/2008 Udall ..................... B64C 5/02
 244/52
2011/0056183 A1* 3/2011 Sankrithi ............... B64C 11/48
 60/204
2012/0104161 A1 5/2012 Shah

* cited by examiner

AIRCRAFT INCLUDING AN ENGINE ATTACHMENT WITH A CONTROL SURFACE

RELATED APPLICATION

This application claims priority to European Patent Application Serial No. 14188900.6 filed on Oct. 14, 2014, the entirety of which is incorporated by reference.

BACKGROUND OF THE INVENTION

The present invention relates to an aircraft comprising a fuselage, a wing, a main landing gear (main gear), and an engine for propelling the aircraft.

The fuselage extends along a longitudinal axis and has a rear end pointing in a reverse direction with respect to the flight direction, and a nose end pointing in the flight direction of the aircraft, which is opposite to the reverse direction. The wing is connected to the fuselage, and typically two wings are connected to opposite sides of the fuselage. The main gear is connected to the fuselage or to the wing in a main gear position with respect to the longitudinal axis. Said main gear position is located further in the reverse direction than a center of gravity of the aircraft. The term "connected" in this context also includes that the main gear is attached to a wing of the aircraft which in turn is attached to the fuselage. The main gear may include at least two main gear units at opposite traverse positions with respect to the axis of the fuselage.

Aircraft engines are provided outside of the fuselage and configured to propel the aircraft in flight. Two engines may be positioned on opposite sides of the fuselage. The engine is attached to the fuselage via an attachment device, such as a strut, in a position spaced apart from the main gear position. The attachment device is formed as a strut having a flat or streamline-shaped cross-section.

The engine, such as a gas turbine or piston engine, generates a repulsive air stream streaming in the reverse direction, which is the opposite to the direction of flight. The repulsive air stream includes any air streams generated by the engine to provide thrust to propel the aircraft in the flight. This repulsive air stream may, therefore, include any air stream generated by an air screw (also referred to as a propeller), a turbofan or combustion process inside a gas turbine engine which includes compression and expansion of a working fluid and discharges a repulsive air stream including comprise combustion gases.

Aircraft with engines attached to the fuselage are well-known, such as the DC-9 aircraft. Two possible arrangements of the tail unit are known for such aircrafts. In one arrangement, the horizontal stabilizer, including the pitch elevator, is positioned out the repulsive air stream, such as above the repulsive air stream in the case of a T-tail as used on the DC-9 aircraft. When the horizontal stabilizer is arranged outside of the repulsive air stream, it has a good stabilizing effect. However, the efficiency of the pitch elevator is reduced during low speed maneuvers, such as during take-off rotation of the aircraft.

In the second arrangement, the horizontal stabilizer including the pitch elevator is positioned to be in the repulsive air stream. In the second arrangement, the efficiency of the pitch elevator is increased due to the repulsive air stream flowing over the stabilizer. In particular, the efficiency of the pitch elevator is high while the engines are at maximum thrust. However, the stabilizing effect of the horizontal stabilizer is rather low since the horizontal stabilizer is streamlined mainly by the repulsive air stream which does not change direction with the airplane's angle of attack. Both the stabilizing effect and the elevating effect depend on the current engine thrust. In view of these disadvantages of the second arrangement, conventional wisdom was to position the horizontal stabilizer outside of the repulsive air stream, as in the first arrangement.

In the first arrangement, the efficiency of the pitch elevator is relatively low, particularly during take-off. The pitch elevator has to generate a high force for take-off rotation. But, the dynamic pressure at the pitch elevator is low due to the slow take-off speed as compared to the flight speed. To provide sufficient force for take-off rotation, the dimensions of the pitch elevator is made larger than is needed for other flight operations. A smaller pitch elevator would save weight, fuel and operational costs.

Further, aircrafts are known in the art, in particular military aircrafts, comprising thrust vector devices. Such thrust vector devices employ surface elements which can be moved into the repulsive air stream in order to deflect the repulsive air stream and cause the aircraft to rotate, e. g. for take-off rotation. However, such thrust vector devices form additional components to the aircraft which are considerably complicated to be attached to the aircraft or engine and considerably complicated to operate. Further, they introduce additional weight into the aircraft which is generally to be reduced.

SUMMARY OF THE INVENTION

We invented and disclose herein a system to provide an aircraft with a simple, cost effective, and light-weight means to initiate or support take-off rotation of the aircraft.

A novel surface element has been conceived which is movably connected to the attachment device, such that it can be moved between a neutral position wherein it does not deflect the repulsive air stream and a deflected position wherein it deflects at least a considerable part of the repulsive air stream. The surface element is plate-shaped or streamline-shaped in cross-section, such as a flap pivotably attached to a trailing edge of the attachment device. The surface element is an aerodynamic control surface used to control the pitch of the aircraft, especially during a take-off roll maneuver.

A drive unit may be provided for controlling movement of the surface element. The engine may be attached to the fuselage via the attachment device in a position between the main gear position and the rear end.

The neutral position is a position of the surface element that does not deflect the repulsive air stream to create a substantial upward or downward force. However, minor local deflections of the repulsive air stream might be caused by the surface element even in the neutral position, as long as these deflections do not cause a considerable resulting force in a direction transverse to the repulsive air stream ahead of the deflections.

In the neutral position, the surface element does not deflect the repulsive air stream or does deflect the repulsive air stream by a certain first amount or angle, while in the deflected position the surface element deflects the repulsive air stream by a second amount or angle higher than the first amount or angle. In general, it is desired that in the neutral position the repulsive air stream, when viewed from a global position, does not change direction during passing the surface element.

By such a surface element the repulsive air stream can be deflected, in an upwards direction, to generate a force supporting rotation of the aircraft during take-off. Any pitch elevator of the aircraft, in particular for T-tail aircrafts, can be configured for flight maneuvers and does need to be configured for initiating take-off rotation. That means the dimensions of the pitch elevator can be chosen considerably smaller so that weight and costs can be saved. Since for high thrusts of the engine the surface element is streamlined by the repulsive air stream with a much higher velocity, such that a high dynamic pressure is applied to the surface element. As the pitch elevator is streamlined by the ambient air, a certain area on the surface element is more effective than the same area on the pitch elevator, which in turn means that the surface element might be considerably smaller compared to the pitch elevator and compared the area of the pitch elevator which can be saved by the invention due to providing of said surface element.

At the same time, no extensive additional structure has to be included into the aircraft because the attachment device to which the surface element is connected is provided, anyway, in order to hold the engine at the fuselage. Merely the surface element has to be provided and movably connected to the attachment device, and a drive unit has to be provided in order to control movement of the surface element.

It is also possible that the surface element is configured and connected to the attachment device such that it can deflect the repulsive air stream in directions other than the upwards direction in order to generate resulting forces in directions other that the opposite the upwards direction. For example, the surface element could be moved in a downwards direction opposite to the upwards direction, thereby deflecting the repulsive air stream in the downwards direction and generating a resulting force in the upwards direction. Further, the attachment device could be attached to the fuselage such that it extends under a certain angle with respect to the pitch axis of the aircraft and the surface element could be moved such that it deflects the repulsive air stream to a side direction, i.e. with a component extending in parallel to the pitch axis of the aircraft, in order to generate a resulting force to the opposite side. In the case that two engines are provided on opposite sides of the fuselage such a side force would require that that the surface areas associated to both engines are deflected differently, i.e. in an asymmetric manner. By such afore-described forces which are directed in other than the downward direction rotation of the aircraft, e.g. about a yaw axis or a roll axis of the aircraft, for other reasons than for take-off can be initiated, such as for controlling during flight or during acceleration on the runway before take-off.

Upwards and downwards directions in the context of the present invention both extend in parallel to a yaw axis of the aircraft, opposite to one another.

In an alternative embodiment, the engine is attached to the fuselage via the attachment device in a position between the main gear position and the nose end. In order to support take-off rotation of the aircraft the surface element according to this embodiment can be moved from the neutral position in the deflected position in the downwards direction, thereby deflecting the repulsive air stream in the downwards direction and causing a resulting force in the upwards direction.

According to an embodiment of the invention, the surface element, while in the neutral position, extends approximately in parallel to the repulsive air stream so that the repulsive air stream streams along an outer surface of the surface element, and wherein in the deflected position the surface element extends transversely to the repulsive air stream, i. e. spanning an angle, an acute angle, with the repulsive air stream, so that at least part of the repulsive air stream impinges onto the surface element. In such a manner, in the deflected position of the surface element the repulsive air stream can be effectively deflected, and in the neutral position of the surface element the repulsive air stream is not or possibly little deflected.

According to another embodiment, the surface element is connected to the attachment device pivotally about a pivot axis, such that it can be pivoted between the neutral position and the deflected position. By a pivotal connection of the surface element to the attachment device the surface element can be moved between the neutral position and the deflected position in a possibly simple manner.

In particular, the pivot axis may be approximately parallel to a pitch axis of the aircraft. In such a way, the surface element can be pivoted from the neutral position to the deflected position in an upwards direction into the repulsive air stream, thereby deflecting the repulsive air stream into said upwards direction, i. e. at least with a component in said upwards direction, in order to generate a resulting force on the surface element in a downwards directions opposite to said upwards direction, i. e. at least with a component opposite to said upwards direction, for supporting take-off rotation of the aircraft.

Alternatively, the engine may be a first engine attached to a first side of the fuselage via a first attachment device to which a first surface element is connected pivotally about a first pivot axis. Further, a second engine is provided and attached to a second side of the fuselage opposite to the first side via a second attachment device to which a second surface element is connected pivotally about a second pivot axis, the first pivot axis and the second pivot axis extend under the same angle with respect to the pitch axis of the aircraft.

In such a manner, even if the first pivot axis and the second pivot axis are not parallel to the pitch axis of the aircraft, as the first pivot axis and the second pivot axis extend under the same angle with respect to the pitch axis, the components of the resulting forces caused at the first surface element and at the second surface element by deflecting the respective repulsive air stream equalize one another, such that a main resulting force resulting from the forces generated at both first and second surface elements extends perpendicularly with respect to the pitch axis of the aircraft and does not have a component in parallel to said pitch axis. Therefore, even if the first and second pivot axes do not extend in parallel to the pitch axis, a resulting force for take-off rotation can be generated without at the same time causing undesired moments rotating the aircraft about a yaw axis.

In another embodiment, the attachment device has a trailing edge pointing in the reverse direction, wherein the surface element is connected to the attachment device at said trailing edge. In such a way, the surface element forms an extension of the attachment device and can be streamlined on both its upper and lower outer surfaces by the repulsive air stream. In such a way, the repulsive air stream can be deflected in a highly effective manner and a possibly high force can be generated.

Alternatively, the attachment device may have an upper surface pointing in an upwards direction, i.e. opposite to that side of the fuselage at which the main gear is provided, wherein the surface element is connected to the attachment device at said upper surface. In such a way, the surface element can be formed as a spoiler or a split flap, wherein in the neutral position the surface element is retracted under or forms part of the upper surface of the attachment device, and in the deflected position the surface element extends upwards from said upper surface in order to deflect the repulsive air stream streaming along said upper surface.

In another embodiment, the engine may comprise at least one open air screw which generates the repulsive air stream. It is also possible that two, counter-rotating, air screws are provided. In particular, the pivot axis may extend further in the reverse direction than the air screw. In such a way, the repulsive air stream generated by the air screw blows on the surface element and pivoting of the surface element about the pivot axis causes the air stream to deflect. In this context, it might be sufficient that the surface element can deflect the repulsive air stream generated by the air screw, but not the exhaust air stream streaming through the turbine and including the combustion gases from the combustion process which drives the air screw. Such exhaust air stream might be exhausted further in the reverse direction than the surface element so that they do not contact the surface element. However, the surface element might also be arranged such that both the repulsive air stream generated by the air screw and the exhaust air stream exhausting the turbine or a combustion chamber contact the surface element in order to be deflected by said surface element.

In an alternative embodiment the engine comprises a turbofan which generates the repulsive air stream, or at least part of said repulsive air stream, and an engine housing having an exhaust area through which the repulsive air stream exits the engine housing. At the exhaust area both the internal stream streaming through the turbine and including any combustion gases, as well as any possible bypass stream generated by the turbo fan exit the engine and blow onto the surface element in the deflected position, or blow along the surface element in the neutral position. In this context, the pivot axis may extend further in the reverse direction than the exhaust area so that the repulsive air stream exiting the engine at the exhaust area can stream along or impinge on the entire length of the surface element.

According to a further embodiment, while in the deflected position the surface element deflects the repulsive air stream in the upwards direction, i. e. at least by a component in the upwards direction. This is carried out by a movement of the surface element in the upwards direction, i.e. at least by a component in the upwards direction. In such a way, a resulting force in the downwards direction opposite to the upwards direction can be generated at the surface element, which may serve for supporting take-off rotation of the aircraft, i.e. rotation of the aircraft about a main gear axis, which is parallel to the pitch axis of the aircraft.

In particular, the dimensions and the position of the surface element along the fuselage may be defined such that at a take-off speed of the aircraft at maximum take-off weight and take-off thrust of the engine, the deflection of the repulsive air stream in the upwards direction generates a force opposite to the upwards direction, which is at least half of a force which together with the force generated by a pitch elevator is sufficient to rotate the aircraft for take-off about the main gear axis about which the main gear rotates. Said main gear axis is parallel to the pitch axis of the aircraft. In such a manner it is guaranteed that by two engines, provided on opposite sides of the fuselage, together with the force caused by the pitch elevator, a sufficient force for initiating take-off rotation of the aircraft can be generated at a take-off thrust of the engine up to a maximum take-off weight of the aircraft.

According to yet a further embodiment, a tail unit is attached to the fuselage between the main gear position and the rear end, when viewed along the longitudinal axis. The tail unit comprises a vertical stabilizer, a horizontal stabilizer, as well as a pitch elevator and a rudder. The pitch elevator is movably connected to the horizontal stabilizer, and the rudder is movably connected to the vertical stabilizer. In particular, the tail unit may comprise a horizontal stabilizer and a pitch elevator which are arranged outside of the repulsive air stream. Further, the tail unit may be formed as a T-tail, wherein the vertical stabilizer is connected to the fuselage and the horizontal stabilizer is connected to the vertical stabilizer at the end opposite to the fuselage. Such a T-tail provides a good stabilizing effect to the aircraft, as it is not streamlined by the repulsive air stream of the engine, and the dimensions of the pitch elevator can be configured for the requirements during flight and are not defined by the requirements for take-off rotation, as for take-off rotation the surface element causes any required force. However, the tail unit may also be formed as a cruciform tail or as a V-tail.

SUMMARY OF THE DRAWINGS

In the following two embodiments of the present invention is shown in the drawings, which are:

FIG. 2b is a rear view of the engine shown in FIG. 2a.

FIG. 3b is a rear view of the engine shown in FIG. 3a.

DETAILED DESCRIPTION OF THE INVENTION

Figure 1:
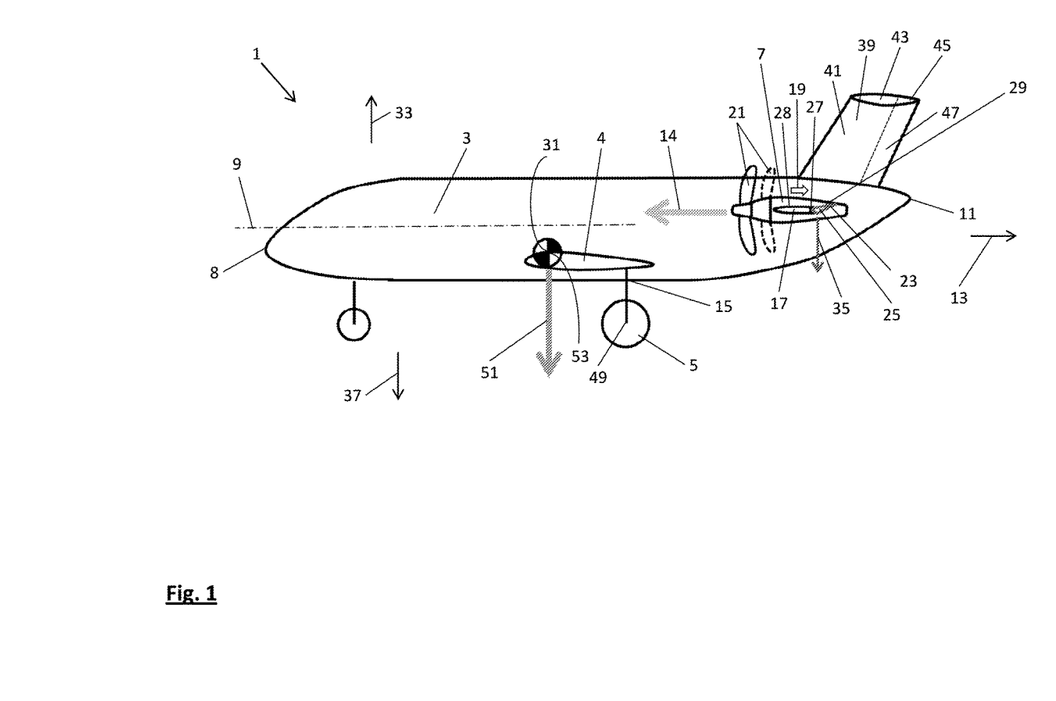
FIG. 1 is a side view of a first embodiment of the aircraft according to the present invention, wherein the engine comprises an open air screw.

FIG. 1 shows a first embodiment of an aircraft 1 according to the present invention is illustrated. The aircraft 1 comprises a fuselage 3, a wing 4, a main gear 5 for landing and including wheels, which support the aircraft on a runway, and a strut between the fuselage and wheels, and an engine 7 for propelling the aircraft 1. The fuselage 3 includes a longitudinal axis 9 which is parallel to the flight direction during straight and level flight. The nose end 8 of the fuselage points in a flight direction 14, and a rear end 11 points in a reverse direction 13 opposite the flight direction 14. The wing 4 is connected to the fuselage 3. The main gear 5 is connected to the fuselage 3 or to the wing 4 in a main gear position 15 with respect to the longitudinal axis 9. The main gear position 15 is located further in the reverse direction 13 than a center of gravity 53 of the aircraft 1.

The engine 7 is attached to the fuselage 3 via an attachment device 17, such as a horizontal strut. The attachment device is behind the main gear position 15 and forward of the rear end 11. The attachment device 17 is formed as a strut or horizontal pylon which has a flat, streamline-shaped cross-section.

Figure 2A:
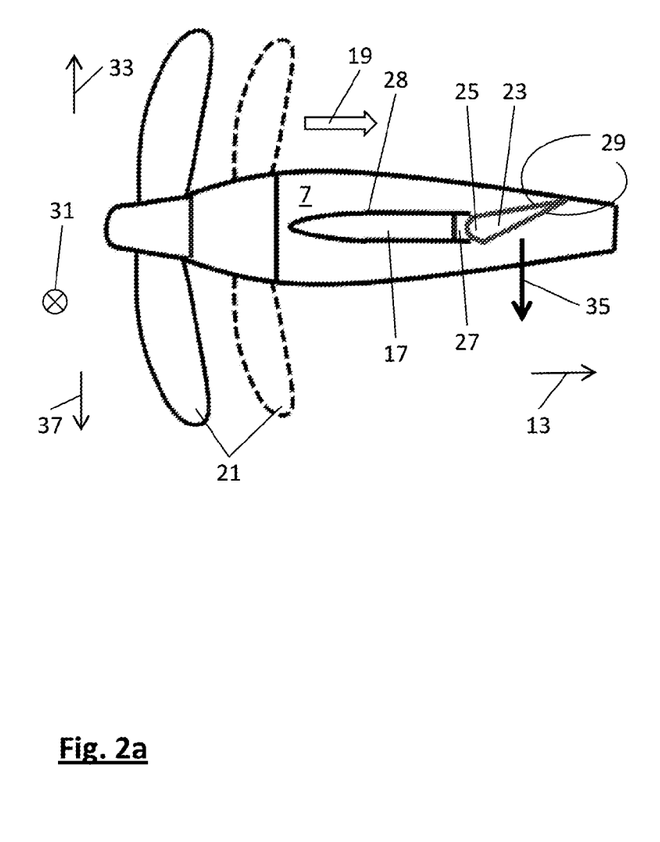
FIG. 2a is a side view of the engine and the attachment device of the aircraft shown in FIG. 1.

The engine 7 is configured to generate a repulsive air stream 19 streaming in the reverse direction 13. On the side of the fuselage 3 opposite from the engine 7 a second engine is provided which corresponds to the engine 7, but which is not shown in the figures. As shown in FIGS. 1 and 2a, the engine 7 comprises an open air screw 21, in particular two counter-rotating air screws 21, for generating the repulsive air stream 19.

Figure 2B:
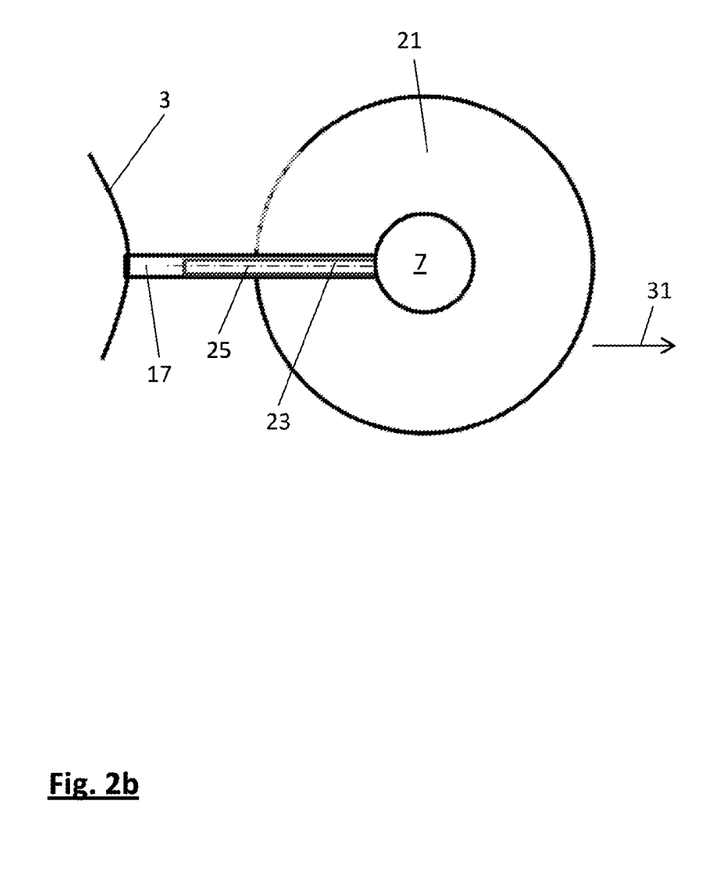

As shown in more detail in FIGS. 2a and 2b, a surface element 23 is provided which is movably connected to the attachment device 17 such that it can be moved between a neutral position wherein it does not reflect the repulsive air stream 19, and a deflected position wherein it deflects the repulsive air stream 19. The surface element 23 is formed as a plate with a streamline-shaped cross-section (see FIG. 2a), and is connected pivotally about a pivot axis 25 to a trailing edge 27 of the attachment device 17, which points in the reverse direction 13, such that it can be pivoted between the neutral position and the deflected position. Alternatively, the surface element 23 might also be connected to an upper surface 28 of the attachment device 17 and operate as a spoiler.

In the neutral position the surface element 23 extends in parallel to the repulsive air stream 19 so that the repulsive air stream 19 streams along an outer surface 29 of the surface element 23. In the deflected position the surface element 23 extends transversely to the repulsive air stream 19 so that the repulsive air stream 19 impinges onto the outer surface 29 of the surface element 23. The pivot axis 25 extends in parallel to a pitch axis 31 of the aircraft 1, such that upon pivoting of the surface element 23 in an upwards direction 33 into the deflected position the surface element 23 deflects the repulsive air stream 19 in the upwards direction 33, thereby generating a resulting force 35 in a downwards direction 37 opposite to said upwards direction 33. As becomes apparent from FIG. 2a, the pivot axis 25 extends further in the reverse direction 13 than the air screw 21 such that the surface element 23 can be fully streamlined by the repulsive air stream 19.

As shown in FIG. 1, the aircraft 1 comprises a tail unit 39 which is attached to the fuselage 3 between the main gear position 13 and the rear end 11, when viewed along the longitudinal axis 9. The tail unit 39 comprises a vertical stabilizer 41, a horizontal stabilizer 43, a pitch elevator 45 movably connected to the horizontal stabilizer 43, and a rudder 47 movably connected to the vertical stabilizer 41. The tail unit 39 is formed as a T-tail, wherein the vertical stabilizer 41 is connected to the fuselage 3 and the horizontal stabilizer 43 is connected to the vertical stabilizer 41 at the end opposite to the fuselage 3.

The dimensions and the position of the surface element 23 along the fuselage 3 are defined such that at take-off speed of the aircraft 1 at maximum take-off weight and take-off thrust of the engine 7, the deflection of the repulsive air stream 19 in the upwards direction 33 generates the resulting force 35 in the downwards direction 37 opposite to the upwards direction 33, which is at least half of a force that together with any downwards directed force caused by the pitch elevator is sufficient to rotate the aircraft 1 for take-off about a main gear axis 49 of the main gear 5. Said main gear axis 49 is parallel to the pitch axis 31 of the aircraft 1. That means, by two engines 7 at take-off thrust a sufficient force can be generated by the two surface elements 23 on the two engines 7 in the deflected position in order to initiate take-off rotation of the aircraft 1 having maximum take-off weight and running at take-off speed, and considering the force already caused by the pitch elevator 45. In order to initiate take-off rotation the total force resulting from the both resulting forces 35 generated by the surface elements 23 at both engines 7 and the distance between the surface elements 23 and the main gear axis 49 together with the force generated at the pitch elevator 45 and the distance between the pitch elevator 45 and the main gear axis 49 has to cause a force moment which is greater than the force moment caused by the resulting weight and aerodynamic force 51 of the aircraft 1 attacking at the center of gravity 53 of the aircraft 1 and the distance between said center of gravity 53 and the main gear axis 49.

Figure 3A:
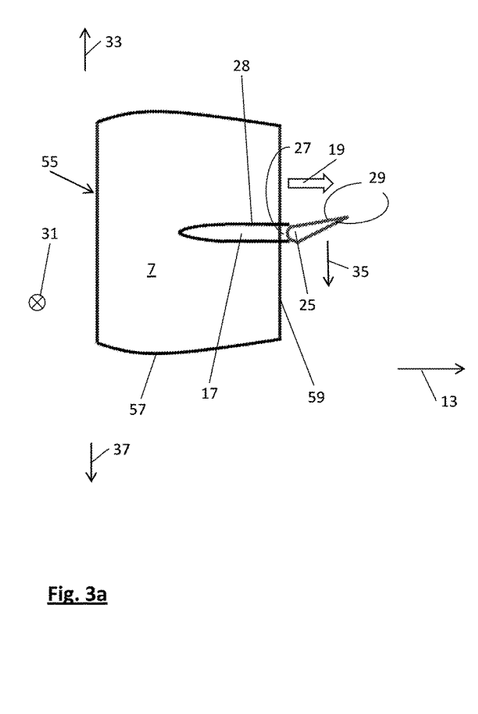
FIG. 3a is a side view of a turbofan engine comprising an engine housing and an attachment device for an aircraft according to a second embodiment the present invention.
Figure 3B:
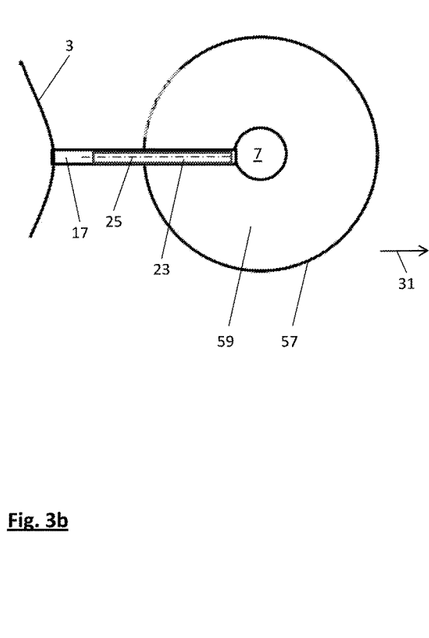

In FIGS. 3a and 3b an alternative engine 7 and attachment device 17 for being provided on an aircraft 1 according to a second embodiment of the invention is shown. This second embodiment only differs from the first embodiment shown in FIG. 1 by the engine 7 and the attachment device 17 including the surface element 23 as shown in FIGS. 2a and 2b, being replaced by an engine 7 and an attachment device 17 including a surface element 23 as shown in FIGS. 3a and 3b. Therefore, the only difference between the embodiment shown in FIGS. 3a and 3b and the embodiment shown in FIGS. 2a and 2b is that instead of an open air screw 21 the engine 7 comprises a turbofan 55 which generates the repulsive air stream 19, and an engine housing 57 having an exhaust area 59 through which the repulsive air stream 19 exits the engine housing 57. In this embodiment, the pivot axis 25 extends further in the reverse direction 13 than the exhaust area 59 so that the entire repulsive air stream 19 exiting the engine housing 57 at the exhaust area 59 can streamline the surface element 23.

During take-off of the aircraft 1 the engine 7 is operated with take-off thrust, usually maximum thrust, so that the aircraft 1 promptly reaches its take-off speed. When take-off speed is reached, the surface element 23 is pivoted from the neutral position to the deflected position, which is the upwards direction 33, thereby deflecting the repulsive air stream 19 caused by the air screws 21 according to the first embodiment or by the turbofan 55 according to the second embodiment, into the upwards direction 33. By this deflection of the repulsive air stream 19 into the upwards direction 33 a resulting force 35 is generated which is directed in the downwards direction 37 opposite to the upwards direction 33. This resulting force 35 together with the distance between the surface element 23 and the main gear axis 49, which serves as a lever, causes a moment which supports take-off rotation of the aircraft 1 about the main gear axis 49.

Figure 4:
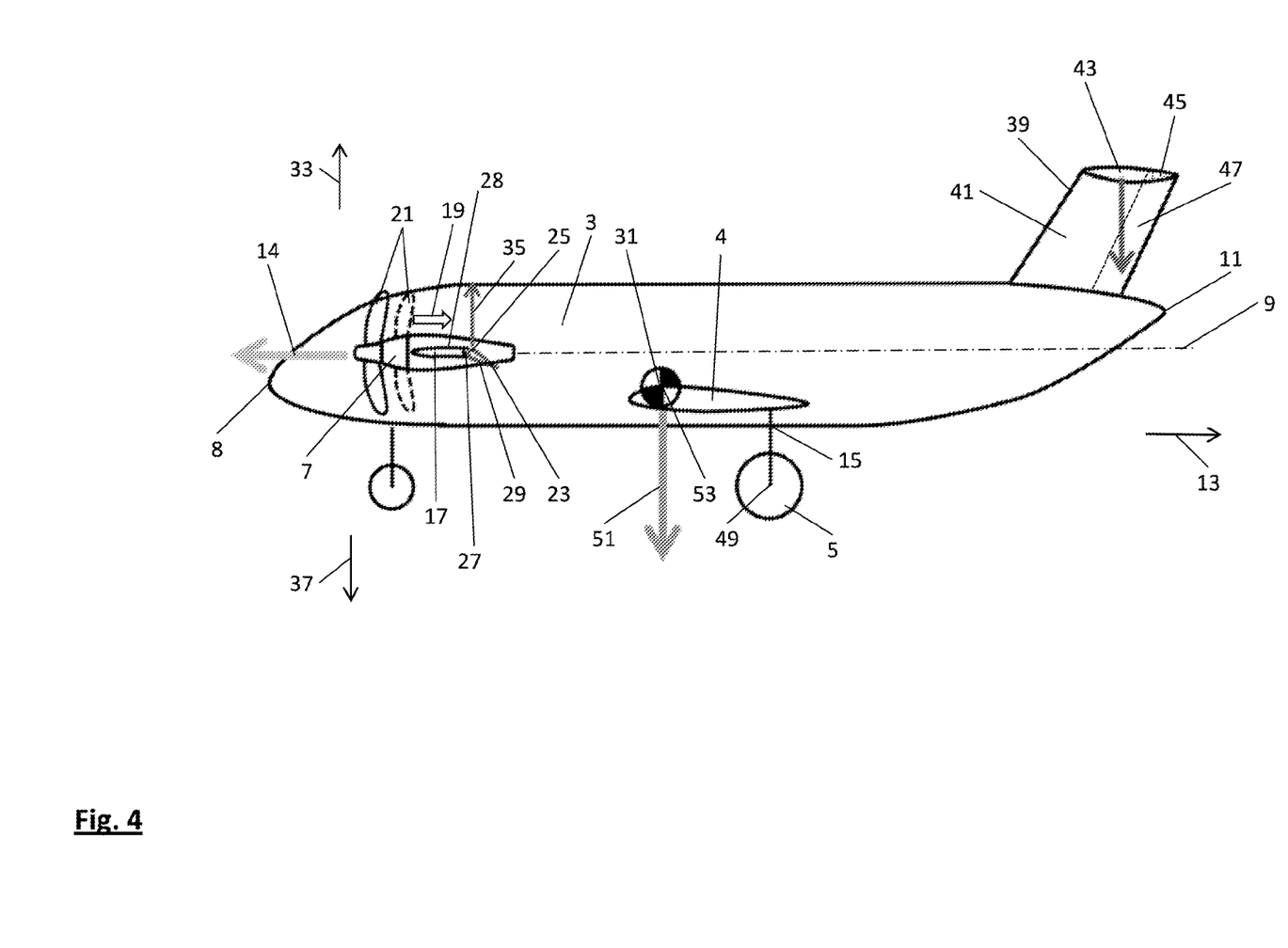
FIG. 4 is a side view of a third embodiment of the aircraft according to the present invention, wherein the engine is arranged between the nose end and the main gear position.

In FIG. 4 a third embodiment of an aircraft 1 according to the present invention is illustrated, which differs from the embodiment shown in FIG. 1 only by the engine 7 being attached to the fuselage 3 via the attachment device 17 in a position between the main gear position 15 and the nose end 8. In order to support take-off rotation of the aircraft 1 the surface element 23 according to the third embodiment can be moved from the neutral position in the deflected position in the downwards direction 37, thereby deflecting the repulsive air stream in the downwards direction 37 and causing a resulting force 35 in the upwards direction 33.

While exemplary embodiments of the invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

We claim:

1. An aircraft comprising:
a fuselage include a longitudinal axis, a rear end pointing in a reverse direction along the longitudinal axis, and a nose end pointing in a flight direction along the longitudinal axis, wherein the reverse direction is opposite to the flight direction;
a wing connected to the fuselage;
a main gear connected to the fuselage or to the wing in a main gear position with respect to the longitudinal axis, wherein the main gear is position behind a center of gravity of the aircraft;
an engine provided outside of the fuselage and attached to the fuselage via an attachment device at a position spaced from the main gear position along the longitudinal axis, wherein the engine generates a repulsive air stream in the reverse direction of the aircraft;
a surface element moveably connected to the attachment device, wherein the surface element is movable between a neutral position at which the surface element does not substantially deflect the repulsive air stream and a deflected position at which the surface element substantially deflects the repulsive air stream, and
a T-shaped tail unit attached to the fuselage between the main gear position and the rear end, wherein the T-shaped tail unit comprises a horizontal stabilizer and a pitch elevator which are outside of the repulsive air stream,
wherein the surface element is aligned with an airscrew or turbofan of the engine, and the alignment is such that a hypothetical line parallel to the longitudinal axis extends through both the surface element and the at least one of the airscrew or turbofan.

2. The aircraft according to claim 1, wherein the engine is attached to the fuselage via the attachment device at a position between the main gear position and the rear end.

3. The aircraft according to claim 2, wherein in the deflected position the surface element deflects the repulsive air stream in the upwards direction.

4. The aircraft according to claim 1, wherein the engine is attached to the fuselage via the attachment device in a position between the main gear position and the nose end.

5. The aircraft according to claim 1, wherein in the neutral position the surface element extends approximately in parallel to the repulsive air stream, so that the repulsive air stream streams along an outer surface of the surface element, and wherein in the deflected position the surface element extends transverse to the repulsive air stream, so that the repulsive air stream impinges onto the surface element.

6. The aircraft according to claim 1, wherein the surface element is connected to the attachment device pivotally about a pivot axis, such that the surface element is pivoted between the neutral position and the deflected position.

7. The aircraft according to claim 6, wherein the pivot axis is approximately parallel to a pitch axis of the aircraft.

8. The aircraft according to claim 6, wherein the engine includes a first engine and second engine, the attachment device includes a first attachment device and a second attachment device, and the surface element includes a first surface element and a second surface element, wherein the first engine is attached to a first side of the fuselage via the first attachment device to which the first surface element is connected pivotally about a first pivot axis, and wherein the second engine is provided and attached to a second side of the fuselage opposite to the first side via the second attachment device to which the second surface element is connected pivotally about a second pivot axis, and wherein the first pivot axis and the second pivot axis extend under the same angle with respect to the pitch axis of the aircraft.

9. The aircraft according to claim 1, wherein the attachment device has a trailing edge pointing in the reverse direction, and wherein the surface element is connected to the attachment device at said trailing edge.

10. The aircraft according to claim 1, wherein the attachment device has an upper surface pointing in an upwards direction, and wherein the surface element is connected to the attachment device at said upper surface.

11. The aircraft according to claim 1, wherein the engine comprises an open airscrew which generates the repulsive air stream.

12. The aircraft according to claim 11, wherein the surface element is connected to the attachment device pivotally about a pivot axis, such that the surface element is pivoted between the neutral position and the deflected position, wherein the pivot axis extends further in the reverse direction than the airscrew.

13. The aircraft according to claim 1, wherein the engine comprises a turbofan which generates the repulsive air stream, and an engine housing having an exhaust area through which the repulsive air stream exits the engine housing.

14. The aircraft according to claim 13, wherein the surface element is connected to the attachment device pivotally about a pivot axis, such that the surface element is pivoted between the neutral position and the deflected position, and wherein the pivot axis extends further in the reverse direction than an exhaust area of the engine.

15. The aircraft according to claim 1, wherein a tail unit is attached to the fuselage between the main gear position and the rear end.

16. The aircraft of claim 1 wherein the surface element is offset from an axis of the engine by a distance less than a radius of an airscrew or turbofan driven by the engine, and the offset is in a direction normal to the longitudinal axis.

17. The aircraft of claim 1 wherein at least a portion of the surface element extends upward beyond the attachment device while the surface element is at the deflected position.

18. An aircraft comprising:
a fuselage and a wing connected to the fuselage;
a main landing gear connected to the fuselage or to the wing, wherein the main gear is behind a center of gravity of the aircraft;
an engine mounted by an attachment device to the fuselage, wherein the engine is offset from the main gear along a longitudinal axis of the fuselage, and
a surface element moveably connected to the attachment device and positioned within a repulsive air stream generated by the engine, wherein the surface element is an aerodynamic control surface movable between a neutral position and a deflected position,
wherein the surface element is aligned with an airscrew or turbofan of the engine, and the alignment is such that a hypothetical line parallel to the longitudinal axis extends through both the surface element and the at least one of the airscrew or turbofan.

19. The aircraft of claim 18 wherein the attachment device is a strut and the surface element is a flap attached to a trailing edge of the strut.

20. The aircraft of claim 18 wherein the surface element is pivotably attached to the attachment device.

21. The aircraft of claim 18 wherein the engine is a turbofan gas turbine including a fan housing, and the surface element extends into the repulsive air stream behind the fan housing.

22. The aircraft of claim 18 wherein the surface element is offset from an axis of the engine by a distance less than a radius of an airscrew or turbofan driven by the engine, and the offset is in a direction normal to the longitudinal axis.

23. The aircraft of claim 18 wherein at least a portion of the surface element extends upward beyond the attachment device while the surface element is at the deflected position.

* * * * *